United States Patent
Roelleke et al.

(10) Patent No.: US 6,732,566 B2
(45) Date of Patent: May 11, 2004

(54) DEVICE FOR SIDE IMPACT DETECTION IN A MOTOR VEHICLE

(75) Inventors: Michael Roelleke, Leonberg-Hoefingen (DE); Pascal Kocher, Gerlingen (DE); Rolf-Juergen Recknagel, Jena (DE); Rolf Aidam, Endingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/238,103

(22) Filed: Sep. 9, 2002

(65) Prior Publication Data

US 2003/0140679 A1 Jul. 31, 2003

(30) Foreign Application Priority Data

Sep. 8, 2001  (DE) ......................................... 101 44 266

(51) Int. Cl.⁷ ................................................ G01M 7/00
(52) U.S. Cl. ........................................ 73/12.08; 73/801
(58) Field of Search .............................. 73/12.01, 12.4, 73/12.07, 12.08, 12.09, 801

(56) References Cited

U.S. PATENT DOCUMENTS

| 4,615,526 | A | * | 10/1986 | Yasuda et al. | ............... | 473/222 |
|---|---|---|---|---|---|---|
| 5,216,210 | A | * | 6/1993 | Kammer | ...................... | 181/144 |
| 6,149,656 | A | * | 11/2000 | Walz et al. | .................. | 606/128 |
| 6,192,632 | B1 | * | 2/2001 | Medebach et al. | ............ | 49/502 |
| 6,428,038 | B1 | * | 8/2002 | Baumann et al. | ........ | 280/730.2 |
| 6,571,515 | B1 | * | 6/2003 | Samways et al. | ............. | 49/502 |

FOREIGN PATENT DOCUMENTS

| DE | 198 45 736 | 4/2000 |
|---|---|---|
| DE | 198 58 760 | 6/2000 |
| EP | 0 667 822 | 8/1995 |

* cited by examiner

*Primary Examiner*—Max Noori
(74) *Attorney, Agent, or Firm*—Kenyon & Kenyon

(57) ABSTRACT

A device for side impact detection in a motor vehicle, and a plausibility sensor side impact detection. This plausibility sensor is located in a loudspeaker which is already present in the lateral part for playback of music. This loudspeaker is used as a low-frequency microphone, a circuit being provided for the loudspeaker to differentiate between sound and rapid fluctuations in air pressure. This circuit has a bridge circuit, the differential voltage across the bridge then being used as a plausibility signal. The circuit itself is preferably located in the door.

3 Claims, 1 Drawing Sheet

DEVICE FOR SIDE IMPACT DETECTION IN A MOTOR VEHICLE

BACKGROUND INFORMATION

European Patent No. 667 822 describes an air pressure detector which detects a side impact in a lateral part of a vehicle on the basis of a quasi-adiabatic increase in pressure. Acceleration sensors and/or structure-borne (noise) sensors are mentioned as plausibility sensors.

SUMMARY OF THE INVENTION

The device according to the present invention for side impact detection in a vehicle has the advantage over the related art that a plausibility check may also be performed on the basis of air pressure fluctuations in the lateral part of the vehicle, and therefore there is no delay in the plausibility check in comparison with a signal from a fast-acting impact sensor, e.g., a pressure sensor or a temperature sensor. Therefore, the restraint devices may be deployed more rapidly. In addition, this achieves an improved means of suppressing deployment of the restraint devices in harmless events such as a door being closed or some other impact on the lateral part. It is also possible to reduce costs through the device according to the present invention because plausibility sensors need no longer be mounted additionally, because the loudspeaker, which is located in the lateral part anyway for playback of music, for example, is used for the plausibility check.

It is particularly advantageous that a circuit for differentiating between sound and rapid fluctuations in air pressure may be connected to the loudspeaker, the circuit being connectable to a control device for the restraint devices. The circuit causes only air pressure fluctuations originating primarily from a side impact, i.e., from compression of the air pressure volume in the lateral part of the vehicle due to a penetrating object, to be taken into account, so it is impossible for other sounds such as music to falsify the measurement. This circuit permits in particular existing loudspeakers already present in the lateral parts of motor vehicles to be used for a plausibility check.

In addition, it is also advantageous that this circuit has a bridge circuit, the differential voltage across the bridge then being used as a plausibility signal.

Finally, it is also advantageous that the circuit in the door is preferably provided on the loudspeaker itself.

DETAILED DESCRIPTION

An increasing number of sensors is being used in systems for impact detection and for controlling restraint devices in motor vehicles. To prevent faulty deployment due to a sensor defect, the deployment decision of a sensor must be confirmed by a second sensor to achieve plausibility. This plausibility must confirm only that an event which might potentially be an impact is occurring, although it does not precisely characterize the impact itself. This plausibility is achieved in part only after the deployment decision, because in the normal case the enabling sensor is not located directly at the impact site, and thus the signal may reach that sensor only with a time lag. The plausibility may have a negative effect on the efficiency of the restraint system particularly in side impact detection with fast-acting sensors (pressure, temperature). Therefore, the plausibility check is omitted with some systems, so a risk of faulty deployment due to sensor defects must be expected.

In addition to acceleration sensors and structure-borne noise sensors, pressure sensors and temperature sensors placed in a lateral part of a motor vehicle are also used as side impact sensors. Both sensors, the pressure sensor and the temperature sensor, use an adiabatic increase in pressure in a lateral part for impact detection when this pressure increase is caused by intrusion of an impacting object into the lateral part. This offers a possibility of particularly rapid side impact detection. To avoid a negative effect on this most rapid possible detection due to a slow plausibility sensor, according to the present invention a loudspeaker, which is already located in a lateral part of a motor vehicle for playback of music, is used as a plausibility sensor. To do so, the loudspeaker is connected to a circuit which differentiates sound such as music from rapid fluctuations in air pressure, which occur in a side impact. The loudspeaker, which may also function as a microphone here, is then used in an impact to detect a sound wave in the vehicle door which may be detected by a low-frequency microphone such as the loudspeaker. This permits very rapid detection of an impact.

Figure 1:
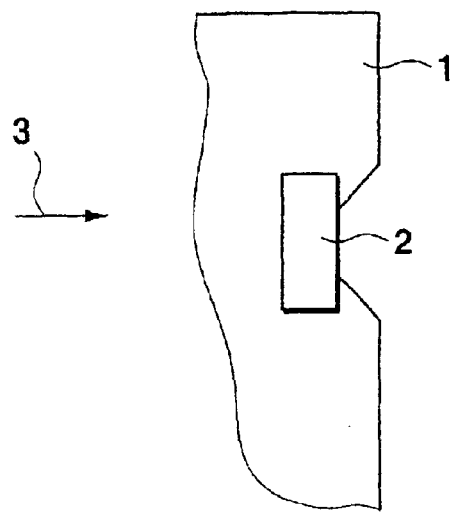
FIG. 1 shows a loudspeaker located in a lateral part of a motor vehicle.

FIG. 1 schematically shows how a loudspeaker 2 is located in a lateral part 1 of a vehicle. Loudspeaker 2 must function as a microphone with respect to the door volume and must not be too large, so there is no effect on the pressure and/or temperature sensor in the door. Arrow 3 schematically indicates the direction of impact from the side.

Lateral part 1, either a side door or another lateral part, must be largely enclosed, so that the pressure and/or temperature sensor for side impact detection is able to measure a largely adiabatic pressure increase which is more rapid than an actual pressure wave. The loudspeaker may also be used as a plausibility sensor in combination with other impact sensors such as deformation sensors or acceleration sensors.

Figure 2:
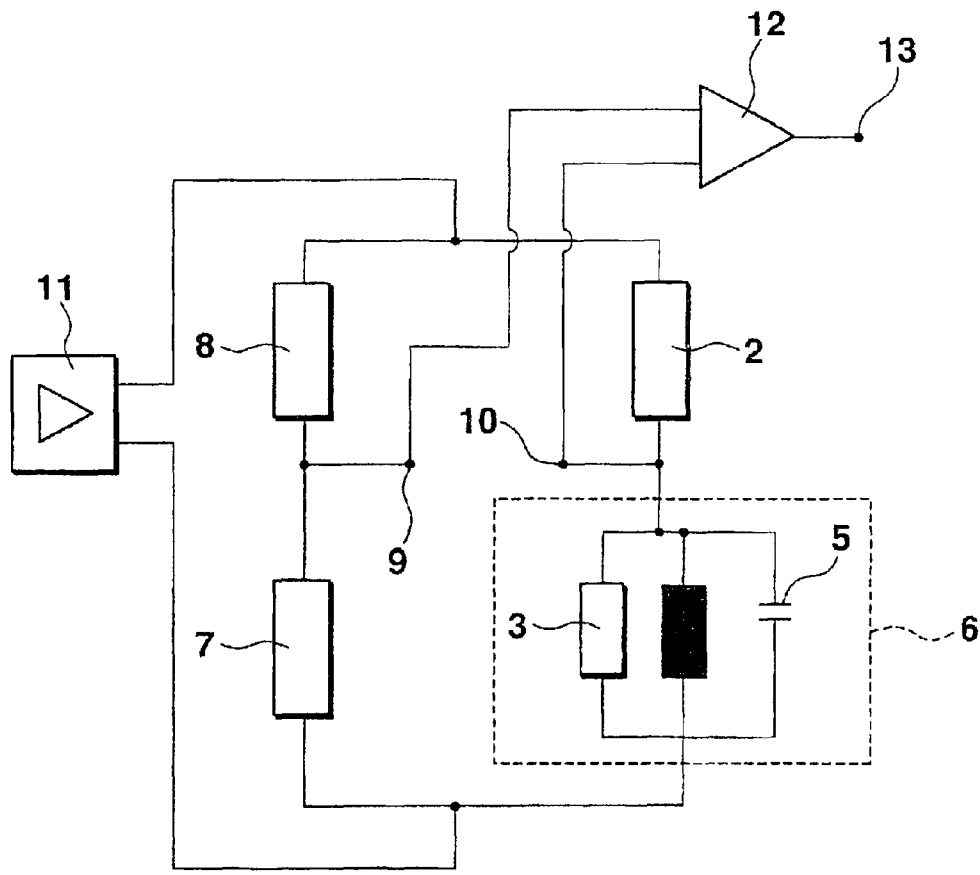
FIG. 2 shows a circuit which permits differentiation between sounds and rapid fluctuations in air pressure.

FIG. 2 shows an exemplary embodiment of a circuit which makes it possible for loudspeaker 2 to function as a low-frequency microphone. Loudspeaker 2 is connected here in a bridge circuit. An equivalent circuit of loudspeaker 2, labeled with reference number 6, is connected in series with loudspeaker 2. Equivalent circuit 6 has a parallel circuit made up by a resistor 3, an inductor 4 and a capacitor 5. Loudspeaker 2 and equivalent circuit 6 thus form the first bridge branch. Two resistors having identical resistances 8 and 7 are connected in series in the parallel bridge branch.

The differential voltage across the bridge is picked up at two points 10 and 9, point 9 being located between resistors 7 and 8, and point 10 being between loudspeaker 6 and equivalent circuit 10. Lines go from points 9 and 10 to a differential amplifier 12 at whose output 13 the plausibility signal is applied, the signal then being compared with a plausibility threshold by a processor in a control device for the restraint devices. This control device may be located centrally in the vehicle or in the lateral part. An audio amplifier 11 applies its signal over two lines between resistor 8 and loudspeaker 2 and between resistor 7 and equivalent circuit 6. This is the music signal, for which loudspeaker 2 provides playback. For the sake of simplicity, this does not show how the audio signals to be amplified reach amplifier 11.

It is possible to measure a differential voltage across the bridge between points 9 and 10 only if an element of the bridge circuit changes. Depending on air pressure fluctuations, however, only the electric characteristics of loudspeaker 2 change, and then only when it acts as a low-frequency microphone. The strength of this signal indicates the severity of the impact, because the air pressure fluctuations increase with the intensity of side impact. It is thus possible to detect a side impact using a loudspeaker in a lateral part. According to this circuit, only the absolute value of the detection signal of loudspeaker 2 is analyzed, but it is also possible to analyze the variation of this signal over time. This allows further conclusions to be drawn regarding the side impact.

What is claimed is:

1. A device for side impact detection in a motor vehicle, the vehicle having a control device for restraint devices, the device comprising:

at least one sensor for side impact detection;

means for checking a plausibility of a signal of the at least one sensor, the means for checking including a loudspeaker situated in a lateral part of the vehicle; and a circuit for differentiating between sound and rapid fluctuations in air pressure adapted to be connected to the loudspeaker and to the control device.

2. The device according to claim 1, wherein the circuit includes a bridge circuit, a differential voltage across the bridge being used as the plausibility signal.

3. The device according to claim 2, wherein the circuit is situated in a door of the vehicle.

* * * * *